I. M. FREDRICK.
POULTRY AND ANIMAL FEEDING DEVICE.
APPLICATION FILED NOV. 12, 1909.
963,041.
Patented July 5, 1910.
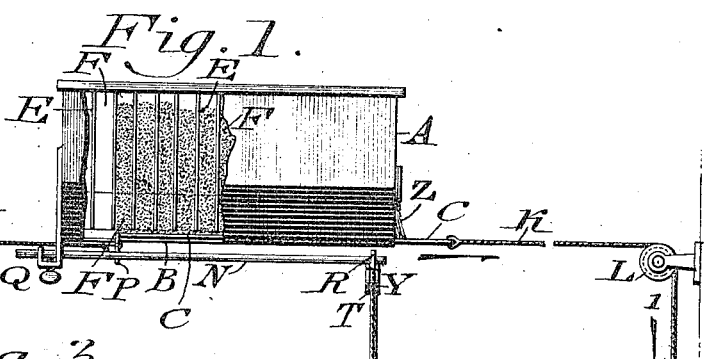
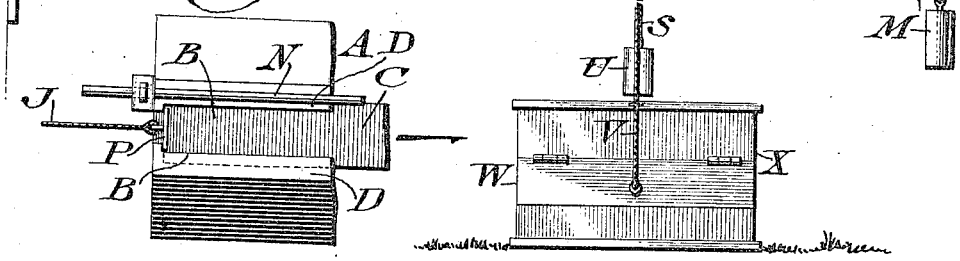
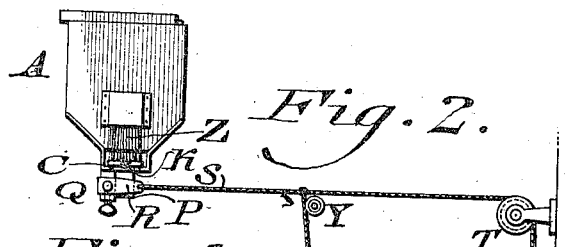
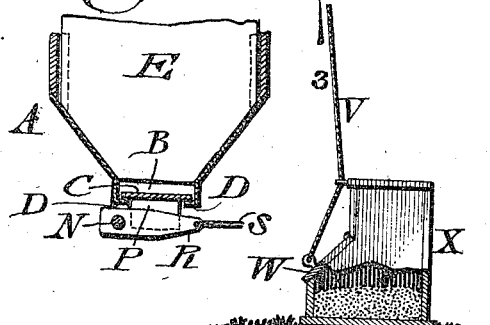
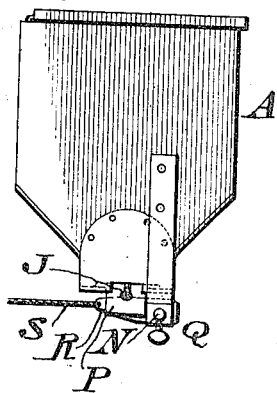
Witnesses
O. F. Nagle
L. Douville
Inventor
Isaac M. Fredrick
By Wiedersheim & Fairbanks
Attorneys

UNITED STATES PATENT OFFICE.

ISAAC M. FREDRICK, OF PERKASIE, PENNSYLVANIA.

POULTRY AND ANIMAL FEEDING DEVICE.

963,041. Specification of Letters Patent. Patented July 5, 1910.

Application filed November 12, 1909. Serial No. 527,606.

*To all whom it may concern:*

Be it known that I, ISAAC M. FREDRICK, a citizen of the United States, residing at Perkasie, Bucks county, State of Pennsylvania, have invented a new and useful Poultry and Animal Feeding Device, of which the following is a specification.

My invention consists of a device for automatically feeding poultry or animals at predetermined times, the same embodying a chambered-supply vessel, a discharge valve therefor, a prime motor for said valve, and means for controlling the motion of said valve, whereby the chambers or compartments of the vessel are successively opened at intervals, whereby poultry or animals will be fed at regulated periods.

It consists also of a feed box adapted to be opened just before the time when poultry is preparing to roost or animals are about to retire, the opening-operation being automatically accomplished.

It consists further of details of construction as will be hereinafter described and pointed out in the claims.

For the purpose of explaining the invention, the accompanying drawings illustrate a satisfactory reduction of the same to practice, but the important instrumentalities thereof may be varied, and so it is to be understood that the invention is not limited to the specific arrangement and organization shown and described.

Figure 1 represents a partial side elevation and partial vertical section of a feeding device embodying my invention. Fig. 2 represents a partial vertical section and partial side elevation at a right angle to Fig. 1. Fig. 3 represents a bottom plan view of a portion thereof. Fig. 4 represents an elevation of a portion opposite to Fig. 2 on an enlarged scale. Fig. 5 represents an elevation of a traveler employed in the device.

Similar letters of reference indicate corresponding parts in the figures.

Referring to the drawings:—A designates a hopper having in its bottom a feed outlet opening B, which is occupied by the slide valve C, which is supported by the walls D of said bottom and guided thereon. In said hopper are vertical partitions E which divide the same into a series of compartments F, each of which is in communication with the open bottom B of the hopper and primarily closed by the valve C.

G designates a train of gearing after the manner of those of a clock, the same having a drum H on which may be wound and from which may be unwound the cord J, the latter being connected with one end of the valve C. To the other end of said valve is connected the cord K, which passes around the guide pulley L and has its free end provided with a weight M which forms a motor for said valve, the same, however, being controlled by the train of gearing G, said weight subjecting said cord K to draft in the direction of arrow 1.

Secured to the hopper A and located beneath the same and extending in the horizontal direction thereof, is the rod N, aside of which and parallel therewith is the traveler P, which is of the form of an eye, the same being attached to the valve C and movable therewith. On the end of the rod N opposite to its place of connection Q with the hopper A, is the throw-off R, which is of the form of an eye which is freely fitted on said rod and adapted to be engaged at a certain time by the traveler P and so stripped from said rod, as will be hereinafter more fully described. Connected with said throw-off is the cord S, which is passed around the guide pulley T and has its end opposite to said throw-off provided with a weight U, so as to subject said cord to the action of the latter in the direction of arrow 2.

V designates a cord which is connected with the cord S intermediate of the ends of the latter, and is attached to the lid W of the feed box X, said cord V being adapted to be guided by the pulley Y, which with the pulley Z, the hopper A, and gearing G are adapted to be sustained in elevated position in any suitable manner, while the box X will be preferably placed on the ground or floor of the place where the poultry or animals are to be fed.

It will be noticed that the valve C will be moved, due to the draft of the weight M as a prime motor, subject to the controlling action of the train of gearing G, so as to move a predetermined extent per day, and the compartments F will be regulated in number according to the divisions of time it may be desired to feed poultry or animals, and thus owing to the action of the valve C, the compartments will be successively opened from below as the adjacent end of the moving valve uncovers the same, and thus feed will be discharged from the compartments one after the other so many hours or minutes apart according as the device is set by the train of gearing, which as is evident will cause the unwinding of the weight-subjected cord J, more or less rapidly, and the consequent discharge of the contents of the compartments at desired intervals. This is the operation during the day, but when it is about time for poultry to roost or animals to rest, the traveler P has about completed its motion and the poultry or animals will receive a final feed in the poultry house, barn, etc. on the floor thereof. In this event, the traveler P strikes the throw-off R and strips it from the rod N, when as it loses its support on the latter, the weight U becomes operative and this draws the cord S in the direction of arrow 2 and with it the cord V in the direction of arrow 3, said cord then being guided on the pulley Y, when the lid W is raised and the box X is open so that poultry or animals have access to the feed therein, the effect of which is evident.

Having thus described my invention, what I claim as new and desire to secure by Letters Patent, is:—

1. An automatic feeding device having a feed-receiving vessel, the same being provided with compartments each having an outlet, a movable closing member for the outlets of said compartments, means for moving said member and means for regulating the speed of said member for successively uncovering said outlets in predetermined time.

2. An automatic feeding device embodying a feed-receiving vessel, the same having an outlet, a movable closing member for the latter, means for operating said member to open said outlet, and a regulator for the speed of said member.

3. In an automatic feeding device, a feed-receiving vessel, the same having an outlet, said vessel being provided with compartments which are adapted to communicate with said outlet, a valve adapted primarily to close said outlet, a prime motor for said valve, whereby said compartments are successively opened and their contents emptied through said outlet, and means for regulating the speed motion of said valve.

4. An automatic feeding device composed of a feed-receiving vessel, the same being provided with a primarily-closed outlet, means for opening said outlet, a supplemental feed-receiving primarily-closed box, and mechanism for opening the same, constructed to be set in motion by said means which opens the outlet to said vessel when the contents of the latter are discharged.

5. An automatic feeding device having a feed-receiving vessel, the same being provided with an outlet, a valve adapted to open and close said outlet, a throw-off adapted to be operated by said valve, a supplemental feed-receiving primarily-closed box, and a connection for the lid of said box with said throw-off whereby when said valve is moved to its greatest extent said box will be opened by the operation of said connection.

6. An automatic feeding device, comprising a feed-receiving vessel and a supplemental feed-receiving primarily-closed box, a valve for closing said vessel, a lid for closing said box, a motor for operating said valve to open said vessel, a weighted connection for the lid of said box, and mechanism intermediate of said connection and valve of said vessel, whereby when the latter is emptied, said box will be automatically opened.

7. An automatic feeding device having a feed-receiving vessel, the same being provided with an outlet, a valve member for closing said outlet, a motor for said member, a traveler connected with said member, a supplemental feed-receiving primarily-closed box, a throw-off piece in the path of said traveler, a support for said piece, and a weighted connection for the lid of said box with said piece, whereby when said vessel is emptied, said throw-off is actuated to release the weighted connection to operate said lid to open said box.

8. In an automatic feeding device, a feed-receiving vessel and a supplemental feed-receiving box, a member for closing the outlet of said vessel, a motor for said member, a traveler attached to said member, a throw-off piece, a support for the same, and a weight-connection for the lid of said box with said piece, the latter being adapted to be in the path of said traveler, whereby when said vessel is emptied, said throw-off will be operated and said box automatically opened.

ISAAC M. FREDRICK.

Witnesses:
CHARLES E. SPRENKEL,
FRANK F. ROSENBERGER.